Oct. 28, 1930.  J. W. MARTIN, JR  1,780,147
REFRIGERATING SYSTEM AND METHOD
Original Filed Nov. 4, 1926  2 Sheets-Sheet 1
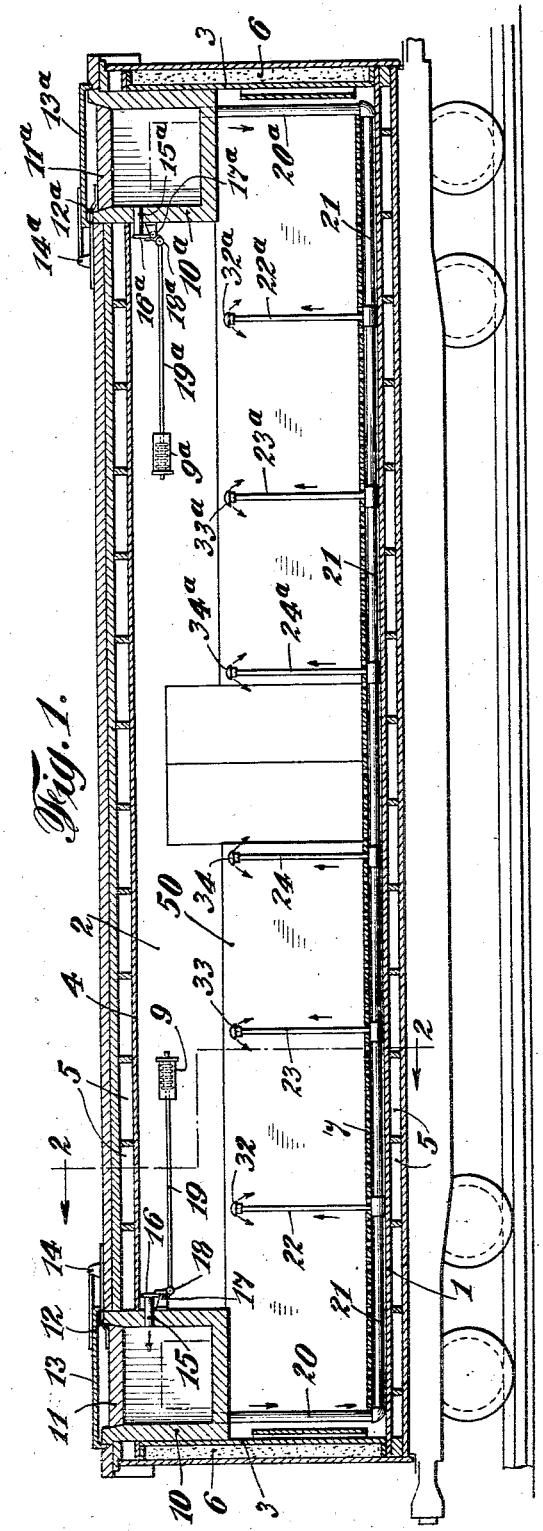
INVENTOR
James W. Martin Jr.
BY
his ATTORNEY

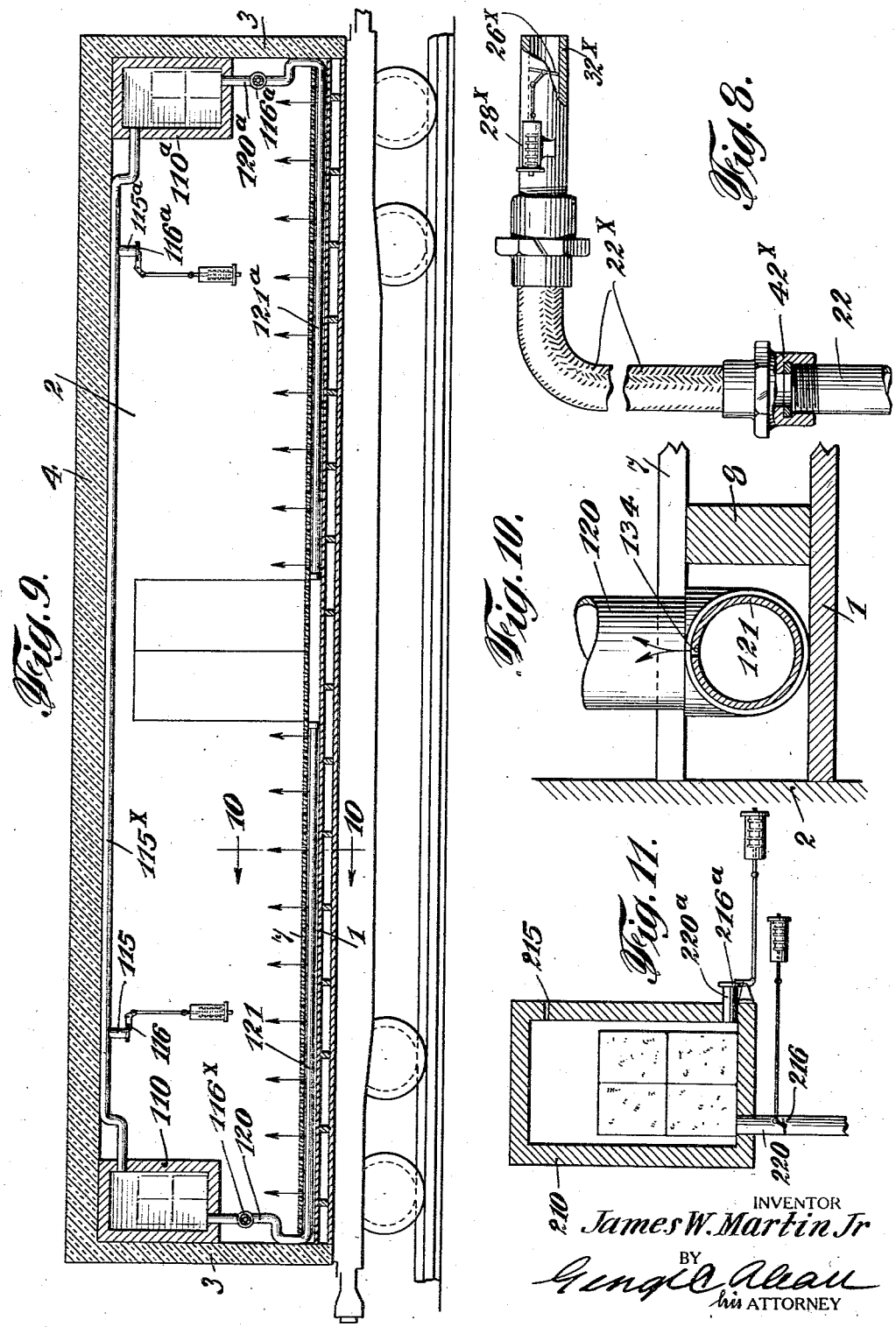

Patented Oct. 28, 1930

1,780,147

UNITED STATES PATENT OFFICE

JAMES W. MARTIN, JR., OF YONKERS, NEW YORK, ASSIGNOR, BY MESNE ASSIGNMENTS, TO DRYICE EQUIPMENT CORPORATION, OF NEW YORK, N. Y., A CORPORATION OF DELAWARE

REFRIGERATING SYSTEM AND METHOD

Application filed November 4, 1926, Serial No. 146,182. Renewed March 17, 1930.

My present invention relates more particularly to a refrigerating system adapted to employ solid carbon dioxide made either by freezing the liquid to solid blocks or by expanding the liquid to so-called snow which may be used as such but is preferably compressed into blocks.

As is well known, solid carbon dioxide melts or rather sublimates directly to gas, without any intermediate liquid state, at a temperature which under conditions of ordinary melting in a closed container is approximately $-110°$ to $-114°$ F. As concerns my present invention, an important feature of this gas is that for equal temperatures it is approximately twice as heavy as air, because of its greater molecular weight, and of course is proportionally heavier when its temperature is very low.

Broadly considered, my invention utilizes these peculiarities of the sublimated carbon dioxide gas according to a method which is novel in two important particulars:

One feature involves utilizing the weight of the gas for gravity circulation thereof through the distributing pipes of a refrigerator chamber, the specific illustration being application of the system to a refrigerator car. This part of my method is related to that disclosed in my prior application, Ser. No. 116,103, filed June 15th, 1926, now Patent 1,752,015, granted March 25, 1930, except that the distribution of the refrigerant value within the car is more by convection currents of the gas itself, and less by heat absorption through large area surfaces exposed to the air within the refrigerated space, and while the circulation in the piping system may be more or less by the thermal differential pressure between the colder heavy gas in the down-take and the warmer gas in the up-take, a distinguishing feature in the present case is maintaining a very substantial gravity head on the gas supply so that there will be a tendency for continuous discharge of gas from the outlet, by simple down-hill flow, independently of the variations introduced by the higher temperature of the gas at the outlet. In practice, this means that the discharge outlets of the pipe system are on a level substantially below the upper level of the gas supply in the container for the supply of frozen carbon dioxide, such arrangement being one of the species described in connection with Fig. 6 of said patent.

Another entirely original feature disclosed in connection with all the figures in my said patent, but claimed only generically in the method claims thereof, is the bringing of air in contact with the frozen carbon dioxide in order to cause a very rapid evaporation of the latter. I have demonstrated conclusively that the frozen carbon dioxide in an atmosphere of carbon dioxide gas alone, evaporates at approximately $-110°$ F., whereas if sufficient air is admitted, the temperature drops to between $-130°$ and $-140°$ F. and with this change in temperature there is a very material increase in the amount of carbon dioxide that is evaporated. A valve thus arranged to open or close the air inlet of the box has the advantage that it is out of the reach of extreme cold and so is not likely to freeze up, but so far as concerns accelerating gas evolution, similar results may be achieved by a valve in the bottom of the box or in the distributing conduit therefrom.

To take advantage of these peculiarities, I place the frozen carbon dioxide in a well insulated box, in which it will rapidly arrive at a state of equilibrium in regard to pressure and temperature, that is one atmosphere pressure and $-110°$ F. temperature. The only evaporation in this condition will be brought about by the very slow leakage of heat through the sides of the insulated box, the resulting gas flowing downward through the piping system as above described. To augment this minimum refrigeration, I arrange a valve preferably in the top of this box which will permit the carbon dioxide to pour out by gravity and which when open will permit air to be sucked in from the car through an inlet provided in the top of the box. Such air operates to accelerate evaporation of the air not only because of its higher temperature, but also because it lowers the partial pressure on the solid carbon dioxide in proportion as it displaces the carbon dioxide gas that normally surrounds the solid carbon dioxide. Thus, as long as the valve is open, the solid carbon dioxide will evaporate and rapidly discharge large amounts of cold carbon dioxide, but on closing of the valve the insulated box soon reaches the same state of substantial equilibrium referred to above and evaporation is minimized until the valve is again opened. What the minimum evaporation will be depends on the extent of the insulation, and to suit conditions this may vary from practically perfect insulation with negligible evaporation when the heat insulation is approximately perfect, up to very much higher values, the limit being when the box is of metal and the insulation is only the frost deposited on the surfaces thereof.

I preferably employ thermostats which regulate the evolution and flow of the gas. This is totally different from using thermostats to regulate access of the refrigerated atmosphere in the car, with respect to the exterior surface of the container. In this respect, my method is radically different from anything heretofore proposed by others, and, as concerns my said patent, the method claims of this present application are limited to the specific arrangement wherein the gas is discharged from the upflow column at a substantially lower level than the source, so that there is a constant tendency to through flow by ordinary drainage from higher to lower levels.

At present, refrigerator cars are cooled by water ice that melts at 32° F., one way being by circulating brine for cooling in the ice bunkers and then through heat absorbing pipes along the sides of the car, the circulation being brought about largely by the jolting of the car in transit.

As contrasted with this, I cause gravity flow of the cold gas in pipes that discharge said gas in whatever part of the carload it is considered most necessary to refrigerate. In the refrigerating of certain loads wherein the packages are well spaced, as for instance, meat hung in a car, it may be possible to permit the gas to flow under the gratings of the car and pass up through the load in a manner similar to the present method of refrigerating with water ice. However, in cargoes loaded into boxes which rather effectively shut off easy circulation of the gas, it will be found best to distribute the gas near the top of the load. In still another condition where fruit is loaded into the car and a quick pre-cooling is essential, pipes that would permit the discharge of the cold gas near the center of the load are very desirable. In the latter case, it is desirable to arrange the valve controlling thermostat within the pipes discharging in the center of the load to prevent the discharge of gas sufficiently cold to freeze the fruit.

The above and other features of my invention will be more evident from the following description in connection with the accompanying drawings, in which Fig. 1 is a longitudinal vertical section showing more or less diagrammatically the conventional construction of a refrigerator car with my gravity-flow, gas-circulating system applied thereto;

Fig. 2 is a vertical section on the line 2—2, Fig. 1;

Fig. 3 is a detail view of a modification showing the circulation controlled by a valve in the horizontal distributing pipe;

Fig. 4 is an enlarged detail view of one of the distributing pipes taken on the same section as Fig. 2;

Fig. 5 is an enlarged detail of the outlet shown in Fig. 3;

Fig. 6 is a detail elevation showing a modified form of outlet;

Fig. 7 is a detail partly in vertical section, showing an internal thermostatically controlled valve for an outlet;

Fig. 8 is a side elevation showing a flexible extension with external thermostat for controlling the outlet;

Fig. 9 is a view like Fig. 1, but showing a modification;

Fig. 10 is a detail section on the line 10—10, Fig. 9; and

Fig. 11 is a sectional detail view of the insulated container for the frozen carbon dioxide having its air circulation controlled by outlet valves.

In Fig. 1 the refrigerator car is indicated as being of conventional construction, having a floor 1, side wall 2, end wall 3 and ceiling 4 of the usual double wall and interspace construction affording heat insulation, either by dead air space as indicated at 5, 5, or by cork, balsa wood or similar filling as indicated at 6. For purposes of my invention I prefer to provide the car with a slat floor 7, supported somewhat above the usual floor 1, on longitudinal timbers 8. Free circulation space is preserved adjacent the walls by suitable means such as diagonal battens or by false walls like the floor 7.

As shown in the drawings, there are two refrigerant bunkers 10, 10$^a$ in opposite ends of the car diagrammatically indicated as of heavy heat insulating construction, adapted to be filled with frozen carbon dioxide. As the construction of these two bunkers as also the various elements of the distributing and control system are similarly but oppositely arranged with respect to the center of the car, description of the lefthand end need not be repeated for the righthand end. The bunker 10 has an insulating closure 11 hinged at 12 and protected by an exterior cover 13 hinged at 14. This permits re-charging of the bunkers without opening the car. Near the roof of the car, the bunker is provided with a high level inlet 15, controlled by valve 16 pivotally mounted at 17 and having a lever end 18 controlled through rod 19 by a thermostat 9, which may be located at any desired height in the car. It will be understood that this thermostat valve as well as the intermediate operating connection are intended to be diagrammatic and illustrative of any known or desired construction usable for such purposes.

Bunker 10 has a downflow drainage pipe 20, connecting with a pipe 21 extending horizontally beneath the slat floor 7, the latter supplying a series of upflow pipes 22, 23, 24, having outlets 32, 33, 34, respectively. The distributive pipe 21 and the outlet pipes 22, 23, etc. are preferably arranged adjacent the side walls of the car so that the latter will not obstruct the cargo space any more than necessary. For gravity drainage of the bunker 10, the outlet level 32, 33, 34 is substantially below the outlet level 15 of said bunker 10.

The similar parts extending from bunker $10^a$ at the other end of the car are indicated by the same numerals, but with added index letter "a". As shown, the lower distributing pipe 21 extends to and constitutes the distributing pipe for the downflow pipe $20^a$ at the righthand end of the car, each pipe 21 draining from both bunkers and their respective intakes being at opposite ends of the respective bunkers. However, it is evident that pipe 21 may be plugged at the center of the car so that each end of the car can receive refrigerant gas only from its own bunker, or one bunker may supply one entire pipe 21, on one side of the car, and the other bunker the corresponding pipe 21, on the other side of the car.

Preferably, the gravity downflow pipe 20, distributing pipe 21 and upflow outlet pipes 22, 23, etc., are of relatively large diameter so as to afford substantial cooling surface of contact with the atmosphere within the car. In a special case, the pipes 20 and 21 may be, say, four inches in diameter and pipes 22, 23, etc. two inches in diameter. Such large pipes make the flow resistance practically negligible while also affording relatively large surface area for heat absorption resulting in refrigeration of the atmosphere within the car by the exterior surface of the pipe and corelatively warming of the gas to more moderate temperatures prior to its overflow into the atmosphere of the car.

In the above described system, there are several novel factors determining flow and variations of flow of the refrigerant medium within the pipes, all cooperating most usefully.

In the first place, the level of the gas in bunkers 10, $10^a$ is higher than the level of outlets 32, $32^a$, etc., so that when inlet valves 16, $16^a$ are open, there is natural, gravity drainage from the bunkers through the outlets by way of downflow pipes 20, $20^a$, distributing pipe or header 21 and the parallel upflow pipes 22, $22^a$, etc. If these outlets are all on the same level, they tend to discharge equal amounts of gas, because the flow is so slow and the pipes are so large that flow resistances are practically negligible.

The principle of this natural gravity drainage is the same as for water or any other fluid contained in a high level tank and draining through a pipe. The static head for down pressure from the high level in the tank to the low point in the pipe is greater than the down pressure of the column extending from the up-column to the low level outlet and the difference in levels represents the pressure differential determining the rate of drainage of the tank through the outlet.

Superposed on the gravity drainage tendency, there are thermo-circulation tendencies. The gas in the down flow column is very cold and correspondingly dense and of great specific gravity. In its slow flow through header pipe 21, it absorbs much heat and becomes appreciably lighter. Consequently, all of the upflow columns are not only shorter but are of less density than the downflow column, thereby increasing the pressure difference and accelerating flow through all of the up-pipes.

An even more important thermo-circulation effect is the tendency of the upflow to be greatest in whichever one of the upflow pipes 22, $22^a$, happens to be most in need of a greater gas supply. That is to say, whenever one upflow pipe gets warmer than another, the gas therein becomes proportionally warmer and lighter, thereby decreasing the counterbalance weight of the gas column in said pipe and increasing the pressure differential in favor of said pipe. Thus, the thermo-circulation tendency has the two important effects of first, increasing the flow of all pipes, in proportion as the upflow pipes heat up and the whole atmosphere needs more refrigeration, and, second, accelerating the flow in any one pipe whenever there is local heating.

As pointed out in my prior application, Ser. No. 116,103, the thermo factor of the circulation becomes more and more prominent according as the upflow leg of the U-circulation approaches the same level with the down leg and conversely, when the top of the upflow leg is shortened, the thermo-circulation effect decreases and the ordinary gravity drainage effect becomes more predominant, until at the limit (illustrated by Fig. 9), the flow is practically all gravity drainage.

These drainage and circulation tendencies which prevail when the valves 16, $16^a$ are open, remain as controlling tendencies when the valves are closed.

In such case, the gravity drainage tendency exhausts itself in establishing a subnormal pressure or a vacuum tendency in the tanks, and the quantity of the flow is then determined entirely by the rate of evaporation of the frozen carbon dioxide by means of heat absorbed through the insulating walls of the container. As before explained, this rate is very slow because, access of air being cut off by closure of the valve, the solid carbon dioxide is surrounded by substantially pure carbon dioxide gas, which is not only a good insulator, but also applies a partial pressure against active evaporation of the frozen carbon dioxide. When the valve, 16 or 16ª, is open, the internal suction draws in atmosphere from adjacent the roof of the car where the percentage of air is greatest, such inrush of air displacing the carbon dioxide gas from its blanketing relation about the solid carbon dioxide, thereby accelerating evaporation and having the peculiar effect of lowering the effective temperature to $-140°$ or $-150°$ F. as above described.

In the specific arrangement shown, opening of the inlet of either bunker either by hand or by its thermostat, 9 or 9ª, will cause the above described accelerated and intensified evaporation. If it happens only in one bunker, the supply of gas from that bunker will increase the pressure throughout the entire length of pipe 21, but the gas reaching the more remote of the upflow pipes adjacent the other tank will part with much of the heat before it reaches said remote pipes. Thus, the increased refrigeration will take effect mainly in the end of the car where undue heat has operated the thermostat.

In Fig. 3, I have shown a cut-off valve, 16ˣ, arranged in distributing pipe 21 and controlled by a thermostat 9ˣ, which may be arranged on or under the floor or at any desired level above the floor. Such valve, 16ˣ, may be employed as supplemental to or preferably as a substitute for the valve 16. In the latter case, the inlet 15 will be normally open and the inlet 15 will operate, when the valve is closed, as a vent for any back pressure due to melting of solid carbon dioxide within the bunker. Such overflow relation through a high level vent has the advantage that all of the air in contact with the solid carbon dioxide is completely expelled by the heavy carbon dioxide gas, before the latter begins to spill out through the vent.

Suitable outlets for the upflow pipes 22, 23, etc., are shown in Figs. 4 and 5. In Fig. 5 there is a cap, 40, supported by spider arms, 41, from screw bushing 42, and in Fig. 6 there is merely a pipe elbow, 43, discharging downward at 44. In both arrangements, the downward direction of the discharge is mainly for the purpose of preventing dirt or other objects from incidentally falling into pipe 22, it being obvious that the cold gas issues at such low velocity that it would flow downward anyway by reason of its great weight.

For some cargoes it may be highly important to prevent escape of gas below a certain predetermined minimum temperature, and in such case I may arrange a valve near the outlet of any pipe, 22, controlled by a thermostatic element located within said pipe. In Fig. 7 I have diagrammatically indicated a valve, 26, having motion multiplying means represented by the short lever arm, 27, in operative relation to the thermosensitive element, 28, which in this case is indicated as a rib bar having small cross-sectional area but great strength. This bar may be of copper, say, two feet long, rigidly supported on a step, 29, and held in operative relation within the pipe by guides, 30.

In Fig. 8 I have shown a further modification, wherein an outlet valve, 26ˣ, inside of a nozzle, 32ˣ, is controlled by an external thermostat, 28ˣ, mounted on the nozzle. This arrangement is of peculiar advantage in combination with the flexible hose pipe, 22ª, which is secured to the ordinary upflow pipe, 22, by means of a screw coupling, 42ˣ. This arrangement is useful where the load is of a material liable to overheat in the center of the mass, the flexible coupling permitting insertion of the nozzle at any desired point in the load and the thermostat insuring against too low temperatures in said locality. Such coupling may be particularly valuable for use near the center door of the car, where heat leaks are most likely to occur, and such attachment may be used either as a substitute for a deflector, 34, 34ª, or as an additional outlet supplemental thereto.

In Figs. 9 and 10, I have shown a modified arrangement. The car structure is diagrammatically indicated and may be the same as in Fig. 1. The bunkers, 110, 110ª, drain through down pipes 120, which may be controlled by hand valves, 116ˣ. In this case, the distributing pipes, 121, 121ª, have no standpipes but discharge beneath the floor through any desired number of vents, 134 (see Fig. 10). As these vents are subject to the full gravity pressure of the gas, from the top of the tank, 110, down to the floor, they are preferably small enough to afford appreciable flow resistance. Consequently, it may be desirable to make the vents nearer the door larger than those nearer the end of the car, to compensate for the higher temperature of the gas at the remoter points.

Fig. 9 also shows that pipe 121 may be supplied solely from tank 110, while tank 110ª has a separate distributing pipe, 121ª, supplied solely by it. It also illustrates that a common air inlet may be employed for both tanks. In such case, the inlets of the two tanks are connected by a pipe, 115ˣ, having an inlet 115, near tank 110 and another inlet, 115ª, near the tank 110ª, said inlets being controlled by separate thermostatic valves, 116, 116ª. When either valve is opened by its thermostat, air will be sucked into pipe 115ˣ by downflow of heavy gas from both bunkers, and the air will be drawn therefrom into both bunkers but more readily into the nearest bunker where the greater heat causes the thermostat to open the valve. If both thermostats operate, the bunkers will each be supplied almost as directly as in Fig. 1.

In Fig. 11, I have shown a further application of the principle described in connection with Fig. 3. The insulated container, 210, has a high level breather hole, 215, that is normally open, and it also has drainage outlets, 220 and 220ª, independently controlled by thermostat valves, 216, 216ª, respectively. When the valves are shut, such gas as is formed by heat conducted through the walls of the container slowly overflows through 215, displacing all air in the container. Whenever either of the drainage valves, 216 or 216ª, is opened, the heavy gas drains out and air is sucked in through vent 215 with the results previously described. Pipe 220 may lead to a distributing pipe such as shown in Fig. 1 or in Fig. 9, and outlet 220ª may be an emergency outlet discharging directly into the atmosphere within the refrigerator chamber. In such case, valve 216ª would be set for an emergency high temperature, while valve 216 would be set for the desired standard operating temperature.

The convection circulation of the gaseous atmosphere set up within the car by the various refrigerant agencies acting thereon, is preferably somewhat as in my prior application, Ser. No. 142,550. That is to say, the cold gas is liberated at multiplicity of suitably distributed points preferably near or above the top of the cargo and from said points tends to flow downward and through the cargo and under the slat floor; thence upward adjacent the side walls of the car where the heat from the exterior tends to create or promote upflow of the atmosphere. Preferably, this separation of the upflow and downflow legs of the convection circuit is promoted by having false walls, 50, spaced apart from the regular walls of the car and extending, preferably above the level of the load and above the level of the gas outlets 32, 32ª, etc.

It will be understood that the level of the upflow outlets 34, 34ª, etc., should be enough lower than the level of the gas in the tank to compensate for the sudden decrease of specific gravity of the downflow column which can occur if the air inlets 15, 15ª, are of too great flow capacity. Usually, however, the atmosphere, even at the roof of the car, will be diluted with carbon dioxide and the gas in the pipes diluted with air so that the required difference of level can be readily attained, particularly if the flow capacity of the inlet is properly predetermined or adjusted. It is also understood that while the flow resistances of the upflow pipes are preferably the same and preferably negligible, they may be varied so as to secure any desired unevenness of distribution of the cold gas and said pipes may be made adjustable in height for similar purposes.

I claim:

1. The method of control of temperature in a refrigerated enclosure by evaporation of solidified carbon dioxide, which method includes minimizing the normal rate of evaporation of said carbon dioxide by enclosing the same in a highly insulated container and controlling access of air to said solidified carbon dioxide, by and in accordance with the temperature of the space to be refrigerated and discharging the resultant gas into said space.

2. The method of control of temperature in a refrigerated enclosure by evaporation of solidified carbon dioxide, which method includes minimizing the normal rate of evaporation of said carbon dioxide by enclosing the same in a highly insulated container and regulably replacing evaporated carbon dioxide by air in the atmosphere within said insulated container, guiding and confining gravity flow of said gas to form serially connected downflow and upflow columns and permitting the gas to overflow from the latter at a level substantially lower than that of the gas source, for the purpose described.

3. A refrigerating apparatus comprising a highly insulated container for solidified carbon dioxide, having an air inlet, an inlet for solidified carbon dioxide, and a gas outlet, in combination with an inlet valve for controlling said inlet.

4. A refrigerating apparatus comprising a container for solidified carbon dioxide, having an inlet for solidified carbon dioxide, an air inlet near the top, and an outlet at a lower level, in combination with means for controlling inlet of the air, including an inlet valve and thermoresponsive operating means controlled by temperature of the resultant refrigerated element or atmosphere.

5. A refrigerating chamber having a high level container for solidified carbon dioxide, a gravity draining conduit for carbon dioxide gas therefrom and an upflow outlet conduit from the latter extending into the refrigerating chamber to discharge the carbon dioxide gas at a level between the bottom of the chamber and the top of the container.

6. A refrigerating chamber having a high level container for solidified carbon dioxide, having a high level inlet, a gravity draining conduit for carbon dioxide gas therefrom and a plurality of laterally distributed upflow outlet conduits from the latter extending into the refrigerating chamber to discharge the carbon dioxide gas at a level between the bottom of the chamber and the top of the container, said outlet orifices being a substantial distance below the level of the top of the solid carbon dioxide container.

7. A refrigerating chamber having a high level container for solidified carbon dioxide, having a high level inlet, a gravity draining conduit for carbon dioxide gas and an upflow outlet conduit from the latter extending into the refrigerating chamber to discharge the carbon dioxide gas at a level between the bottom of the chamber and the top of the container, said parts being in U-relation, the level of the outlet of the up-column being a predetermined distance lower than the inlet level of the container for the purpose described.

8. A refrigerating chamber having therein a high level insulated container for solidified carbon dioxide and a gravity draining conduit for carbon dioxide gas therefrom having a low level laterally extending portion with distributed upflow outlets from the latter extending into the refrigerating chamber to discharge the carbon dioxide gas at a level between the bottom of the chamber and the top of the container.

9. A refrigerating apparatus comprising a highly insulated container for solidified carbon dioxide, having an air inlet, an inlet for solidified carbon dioxide, and a gas outlet, and means for discharging gas therefrom at a multiplicity of points in said chamber, in combination with means for controlling opening and closing of an air inlet.

10. A refrigerating apparatus comprising a container for solidified carbon dioxide, having an inlet for solidified carbon dioxide, an air inlet near the top, and an outlet at a lower level; means for controlling inlet of the air, including a valve and thermoresponsive operating means controlled by temperature of the resultant refrigerated element or atmosphere, in combination with a downflow pipe leading from the outlet to a laterally extending, low-level pipe distributing the gaseous flow through a plurality of upflow pipes having their outlets below the level of air admission in said container.

11. A refrigerator car having high level, insulated bunkers for solidified carbon dioxide, one in each end of the car, each bunker having a high level inlet and a gravity draining conduit for carbon dioxide gas discharging into a low level distributing conduit having a plurality of laterally distributed upflow outlet conduits having outlet orifice a substantial distance below the level of the bottom of the solid carbon dioxide container extending into the refrigerating chamber to discharge the carbon dioxide gas at a level between the bottom of the chamber and the top of the container.

12. A refrigerator car having high level, insulated bunkers for solidified carbon dioxide, one in each end of the car, each bunker having a high level inlet and a gravity draining conduit for carbon dioxide gas discharging into a low level distributing conduit having a plurality of laterally distributed upflow outlet conduits having outlet orifice a substantial distance below the level of the bottom of the solid carbon dioxide container extending into the refrigerating chamber to discharge the carbon dioxide gas at a level between the bottom of the chamber and the top of the container, and all of said outlets being substantially the same level.

13. A refrigerator car having high level bunkers for solidified carbon dioxide, one in each end of the car and each bunker having a high level inlet and a gravity draining conduit discharging into a distributing conduit for carbon dioxide gas and upflow outlet conduits from the latter extending into the refrigerating chamber to discharge the carbon dioxide gas at a level between the bottom of the chamber and the top of the container, said parts being in U-relation, the level of the outlet of the up-column being a predetermined distance lower than the inlet level of the container for the purpose described.

Signed at New York city, in the county of New York and State of New York, this 3rd day of November, A. D. 1926.

JAMES W. MARTIN, Jr.